US007680545B2

(12) United States Patent
Gebert

(10) Patent No.: US 7,680,545 B2
(45) Date of Patent: Mar. 16, 2010

(54) SYSTEM AND METHOD FOR SPEED MEASUREMENT VERIFICATION

(76) Inventor: Rudiger Heinz Gebert, 153 Nerine St., Club View Extension 6, Centurion, Gauteng 0157 (ZA)

( * ) Notice: Subject to any disclaimer, the term of this patent is extended or adjusted under 35 U.S.C. 154(b) by 108 days.

(21) Appl. No.: 11/817,319

(22) PCT Filed: Mar. 3, 2006

(86) PCT No.: PCT/ZA2006/000032

§ 371 (c)(1),
(2), (4) Date: Oct. 22, 2007

(87) PCT Pub. No.: WO2006/094318

PCT Pub. Date: Sep. 8, 2006

(65) Prior Publication Data

US 2008/0266140 A1 Oct. 30, 2008

(30) Foreign Application Priority Data

Mar. 3, 2005 (ZA) .............................. 2005/01822

(51) Int. Cl.
*G05B 15/00* (2006.01)
*G05B 19/18* (2006.01)
*G05B 13/02* (2006.01)
*G01C 17/38* (2006.01)
*G08G 1/01* (2006.01)

(52) U.S. Cl. .............................. 700/1; 700/52; 700/58; 700/304; 702/96; 702/142; 702/143; 702/148; 340/936; 340/937; 342/461

(58) Field of Classification Search .................... 700/1, 700/52, 58, 304; 702/96, 142–143, 148; 340/905–907, 936–937; 342/461; 382/107; 324/162
See application file for complete search history.

(56) References Cited

U.S. PATENT DOCUMENTS 3,690,233 A 9/1972 Bilingsley
4,214,265 A * 7/1980 Olesen ...................... 348/149

(Continued)

FOREIGN PATENT DOCUMENTS

GB 1059129 2/1967

(Continued)

*Primary Examiner*—Ramesh B Patel
(74) *Attorney, Agent, or Firm*—Vani Moodley; Hahn and Moodley LLP

(57) ABSTRACT

This Invention provides for a method and system for speed measurement verification. The method comprises the step of automatically measuring the speed of a vehicle traveling on a surface which includes a fixed marker at a predetermined distance from a point where the speed of the vehicle is measured. The measured speed is automatically compared to a predetermined speed limit and if the speed limit is exceeded, the next step involves automatically calculating a time delay, which time delay is calculated according to the measured speed and the predetermined distance so as to predict when the vehicle, if traveling at the measured speed, will reach the marker. An image is then captured with a camera directed at the marker after expiration of the time delay so that, if the measured speed is accurate, the vehicle will be positioned proximate the marker so that the captured image showing the vehicle relative to the marker is able to serve as verification of the accuracy of the measured speed.

15 Claims, 3 Drawing Sheets

U.S. PATENT DOCUMENTS

| | | | | |
|---|---|---|---|---|
| 4,866,438 | A * | 9/1989 | Knisch | 340/936 |
| 4,887,080 | A * | 12/1989 | Gross | 340/937 |
| 5,041,828 | A * | 8/1991 | Loeven | 340/937 |
| 5,115,109 | A * | 5/1992 | Fisher | 200/86 A |
| 5,298,738 | A * | 3/1994 | Gebert et al. | 250/222.1 |
| 5,734,337 | A * | 3/1998 | Kupersmit | 340/937 |
| 5,742,699 | A * | 4/1998 | Adkins et al. | 382/107 |
| 5,767,794 | A * | 6/1998 | Borsch et al. | 340/937 |
| 6,546,119 | B2 * | 4/2003 | Ciolli et al. | 382/104 |
| 6,681,195 | B1 * | 1/2004 | Poland et al. | 702/142 |
| 6,696,978 | B2 * | 2/2004 | Trajkovic et al. | 340/936 |
| 6,827,265 | B2 * | 12/2004 | Knowles et al. | 235/462.01 |
| 2002/0054210 | A1 * | 5/2002 | Glier et al. | 348/149 |
| 2002/0141618 | A1 * | 10/2002 | Ciolli et al. | 382/104 |
| 2004/0101166 | A1 * | 5/2004 | Williams et al. | 382/104 |
| 2005/0203697 | A1 * | 9/2005 | Dalgleish | 701/117 |
| 2006/0139204 | A1 * | 6/2006 | Abe et al. | 342/52 |
| 2006/0269104 | A1 * | 11/2006 | Ciolli | 382/104 |
| 2008/0239079 | A1 * | 10/2008 | Millar | 348/148 |

FOREIGN PATENT DOCUMENTS

| | | |
|---|---|---|
| GB | 2342800 | 4/2000 |

* cited by examiner

SYSTEM AND METHOD FOR SPEED MEASUREMENT VERIFICATION

FIELD OF THE INVENTION

This invention relates, in general, to the verification of a vehicle's speed and, more specifically, to a system and associated method for speed measurement verification.

BACKGROUND TO THE INVENTION

Systems for measuring the speed of a vehicle are known. Examples include radar guns, pressure sensors placed across a road, and/or the like. These systems typically provide an image, e.g. a photograph, of a vehicle caught speeding. In certain situations, it has become necessary to provide a secondary independent verification of the accuracy of these systems to corroborate the evidentiary value of these measurements when prosecuting speeding motorists. Various methods of providing such independent verification exist, but the known methods require elaborate measurements and additional hardware. This Invention proposes a possible simple and efficient solution whereby independent speed verification may be accomplished.

SUMMARY OF THE INVENTION

According to a first aspect of the invention there is provided a system for speed measurement verification, which system includes speed measuring means configured to automatically measure the speed of a vehicle traveling on a surface which includes a fixed marker at a predetermined distance from a point where the speed of the vehicle is measured;

a camera for directing at said marker, in use; and a processor arranged in electronic communication with the speed measuring means and the camera, which processor is configured to automatically compare the measured speed of the vehicle to a predetermined speed limit and, if the measured speed exceeds such a speed limit, to automatically calculate a time delay according to the measured speed and the predetermined distance so as to predict when the vehicle, if traveling at the measured speed, will reach the marker, the processor being further configured to activate the camera after expiration of said time delay so that, if the measured speed is accurate, the vehicle will be proximate the marker so that the image captured when the camera is activated by the processor will show the vehicle relative to the marker in order to verify the accuracy of the measured speed.

It is to be appreciated that, by the processor mathematically predicting when the vehicle should reach the marker and subsequently capturing an image at such predicted instance, the image will in itself verify the accuracy of the measured speed if the image shows the vehicle to be proximate the marker, as the predicted instance at which the image is captured is dependent on the measured speed of the vehicle.

The speed measuring means may be configured to measure the speed of the vehicle by transmitting an electromagnetic wave to the vehicle and receiving the transmitted electromagnetic wave reflected from the vehicle, so that the speed is determinable according to the flight time of the wave having a known velocity.

It is to be appreciated that the electromagnetic wave may include any suitable frequency, amplitude, or similar wave characteristic. As such, the electromagnetic wave may include a radio frequency wave, a light wave, or the like.

The speed measuring means may include an electromagnetic wave transmitter configured to automatically and sequentially transmit at least two pulsed electromagnetic waves having known velocities to the vehicle, and a receiver configured for automatically receiving the transmitted electromagnetic waves reflected from the vehicle. Accordingly, the processor may then measure the speed of the vehicle by determining a change in distance of the vehicle from the transmitter by considering the known velocity of a transmitted wave together with the time taken between transmission and reception of that wave, so that the processor is able to calculate the distance from the transmitter to the vehicle, wherein the speed of the vehicle is measured by dividing the measured change in distance of the vehicle by a predetermined interval between the transmission of the waves to the vehicle.

Otherwise, the speed measuring means may measure the speed by including a transmitter being configured to transmit at least one continuous electromagnetic wave having known characteristics to the vehicle, and including a receiver being configured to receive the reflected wave from the vehicle, so that the processor is able the measure the speed by analyzing any changes in the characteristics of the reflected wave, e.g. a Doppler effect, or the like.

The electromagnetic wave may include a laser beam, a radar beam, or any electromagnetic wave having a suitable frequency.

Otherwise, the speed measuring means may include a pressure sensor, e.g. a piezo sensor, a pneumatic sensor, a hydraulic sensor, or the like. This pressure sensor is typically placed on the road so that a vehicle traveling on the road triggers this pressure sensor by traveling over it. The speed measuring means may include any suitable proximity sensor for detecting when a vehicle is at the point, or the like.

It is to be appreciated that the point where the speed measuring means measures the speed of the vehicle may vary and lie somewhere between the marker and a physical position of the speed measuring means, e.g. where the speed measuring means is a radar gun or laser, the marker is fixed but the point where the speed of the vehicle is measured may vary. It is thus necessary in this instance where the point may vary to establish the position of this point in order to determine the predetermined distance.

As such, the speed measuring means may be configured to measure the distance of the vehicle from the speed measuring means to determine the distance of the point to the marker, i.e. the predetermined distance, e.g. a laser measurement system able to measure the distance of the vehicle from said laser measurement system when a measurement is taken, or the like.

The camera may include a digital camera. The camera may be directed at the marker so that, when the image is captured, the vehicle and/or the driver are identifiable for prosecution purposes, e.g. so that the image shows the vehicle near the marker so that the license plate can be read.

The time delay may be incorporated in the captured image, e.g. printed on the image, digitally stored on the image, or the like. In addition, an actual time measurement of a period it took the vehicle to reach the marker may be incorporated with the captured image, e.g. a measured time delay as opposed to the calculated time delay.

The system may be configured to transmit the captured image to a remote location. As such, the system may include a suitable transmitter.

The system may include the marker. The marker may include at least one line painted onto the surface, e.g. a perpendicular line across the breadth of a road, or the like. The marker may include tolerances, e.g. one center line at the predetermined distance with a line on either side at a specific tolerance distance from the center line. The tolerances may be calculated according to the speed limit, expected speeds on the surface, the predetermined distance, the tolerances of equipment used, and/or the like.

Accordingly, it is to be appreciated that the vehicle will be proximate the marker if a particular portion of the vehicle, e.g. the front wheels, the rear wheels, the front bumper, or the like, is within the tolerances of the marker when the image is captured. It is further to be appreciated that, if the particular portion of the vehicle is not within the tolerances when the image is captured, the image does not verify that the measured speed is correct.

The processor may calculate the time delay to compensate for any delays of the speed measuring means and/or camera, e.g. camera shutter speed, communication delays between the components, calculation delays, and/or the like.

According to a second aspect of the invention there is provided a method of speed measurement verification, associated with the above system, which method includes the following steps automatically measuring the speed of a vehicle traveling on a surface which includes a fixed marker at a predetermined distance from a point where the speed of the vehicle is measured;

automatically comparing the measured speed of the vehicle to a predetermined speed limit;

automatically calculating a time delay if the measured speed exceeds the speed limit which time delay is calculated according to the measured speed and the predetermined distance so as to predict when the vehicle, if traveling at the measured speed, will reach the marker; and automatically capturing an image with a camera directed at the marker after expiration of the time delay so that, if the measured speed is accurate, the vehicle will be positioned proximate the marker so that the captured image showing the vehicle relative to the marker is able to serve as verification of the accuracy of the measured speed.

It is to be appreciated that, by mathematically predicting when the vehicle should reach the marker and subsequently capturing an image at such predicted instance, the image will in itself verify the accuracy of the measured speed if the image shows the vehicle to be proximate the marker as the predicted instance at which the image is captured is dependent on the measured speed of the vehicle.

The step of measuring the speed of the vehicle may include measuring the speed by means of transmitting an electromagnetic wave to the vehicle. Accordingly, the step of measuring the speed may include receiving a transmitted electromagnetic wave reflected from the vehicle.

The step of automatically measuring the speed of the vehicle traveling on the surface may include determining a change in distance of the vehicle from a stationary transmitter which sequentially transmits at least two pulsed electromagnetic waves having known velocities to the vehicle so that a suitable receiver receives the waves reflected from the vehicle, wherein the known velocity of a wave together with the time taken between transmission and reception of that wave enables the calculation of the distance from the transmitter to the vehicle, so that the speed of the vehicle is calculated by dividing the measured change in distance of the vehicle by a predetermined interval between the transmission of the separate waves to the vehicle.

Otherwise, the step of measuring the speed may include transmitting at least one continuous electromagnetic wave having known characteristics to the vehicle and analyzing the reflected wave to determine the speed of the vehicle from any changes in the characteristics of the reflected wave, i.e. the Doppler effect, or the like.

The method may include, prior to measuring the speed of the vehicle, the step of placing the marker on the surface. The marker may include at least one line painted onto the surface, e.g. a perpendicular line across the breadth of a road, or the like. The marker may include tolerances, e.g. one center line at the predetermined distance with a line on either side at a specific tolerance distance from the center line. The tolerances may be calculated according to the speed limit, expected speeds on the surface, the predetermined distance, the tolerances of equipment used, and/or the like.

Accordingly, it is to be appreciated that the vehicle will be proximate the marker if a particular portion of the vehicle, e.g. the front wheels, the rear wheels, the front bumper, or the like, is within the tolerances of the marker when the image is captured. It is further to be appreciated that, if the particular portion of the vehicle is not within the tolerances when the image is captured, the image does not verify that the measured speed is correct.

It is to be appreciated that the point where the speed of the vehicle is measured may vary and that this point may lie somewhere between suitable speed measuring means and the marker, e.g. where radar measurement is done, or the like. Accordingly, it is first necessary to establish the position of the point before the predetermined distance may be determined.

As such, the step of measuring the speed may include measuring the distance of the vehicle to suitable speed measuring means to determine the distance of the point where the speed of the vehicle is measured to the marker The time delay may be calculated to compensate for any reaction speeds of equipment used to measure the speed or capture the image, e.g. communication speeds of equipment, camera shutter speed, and/or the like.

The time delay calculated to predict when the vehicle will reach the marker may be incorporated with the captured image, i.e. printed on the image, digitally stored on the image, or the like. In addition, an actual time measurement of a period it took the vehicle to reach the marker may be incorporated with the captured image, e.g. a measured time delay as opposed to the calculated time delay.

The camera may be directed at the marker so that, when the image is captured, the vehicle and/or the driver are identifiable for prosecution purposes, e.g. so that the image shows the vehicle near the marker so that the license plate can be read.

BRIEF DESCRIPTION OF THE DRAWINGS

The invention is now described, by way of non-limiting example, with reference to the accompanying drawings wherein.

DETAILED DESCRIPTION OF THE INVENTION

Figure 1:
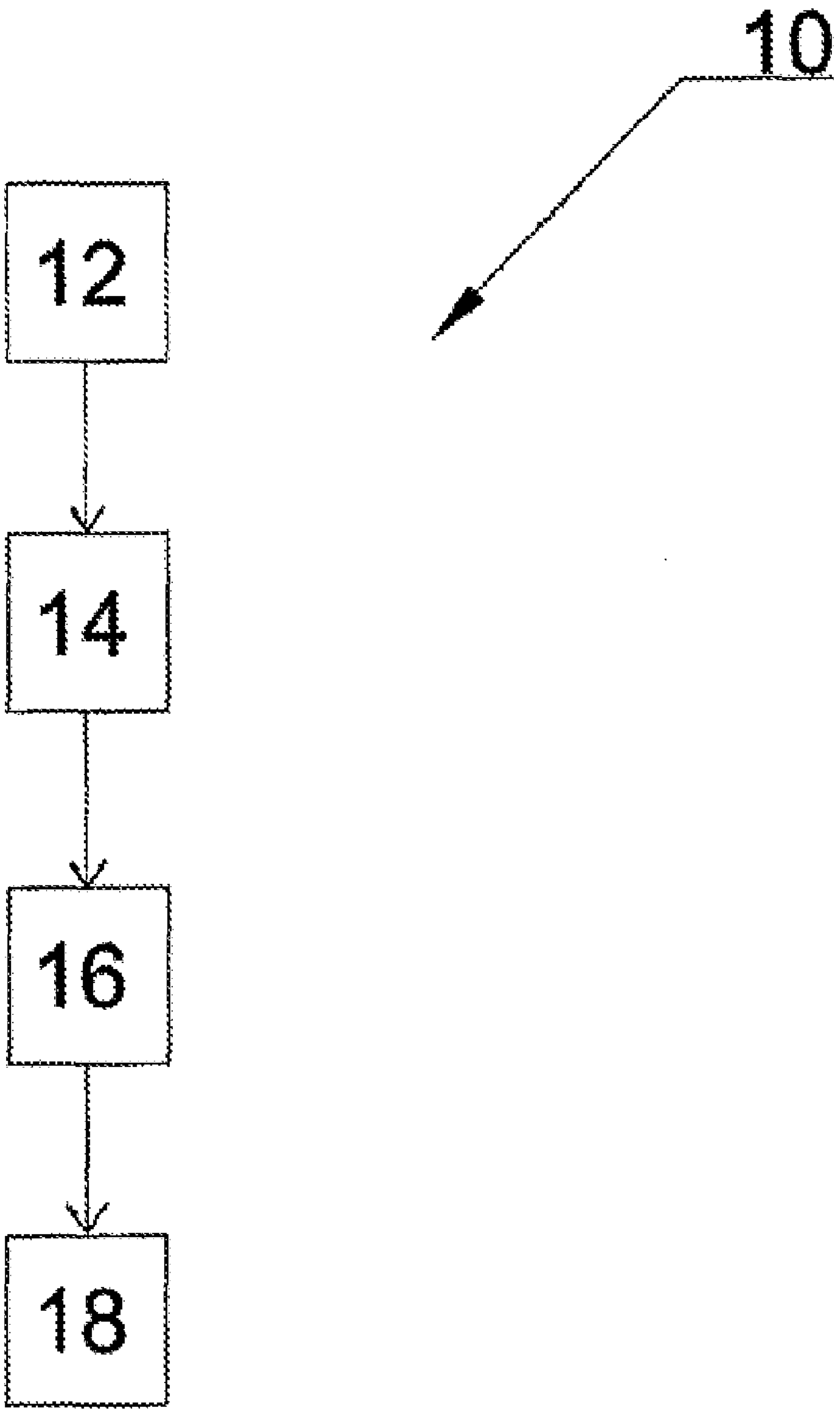
FIG. 1 shows, in diagrammatic view, a method for speed measurement verification, in accordance with the invention.
Figure 2:
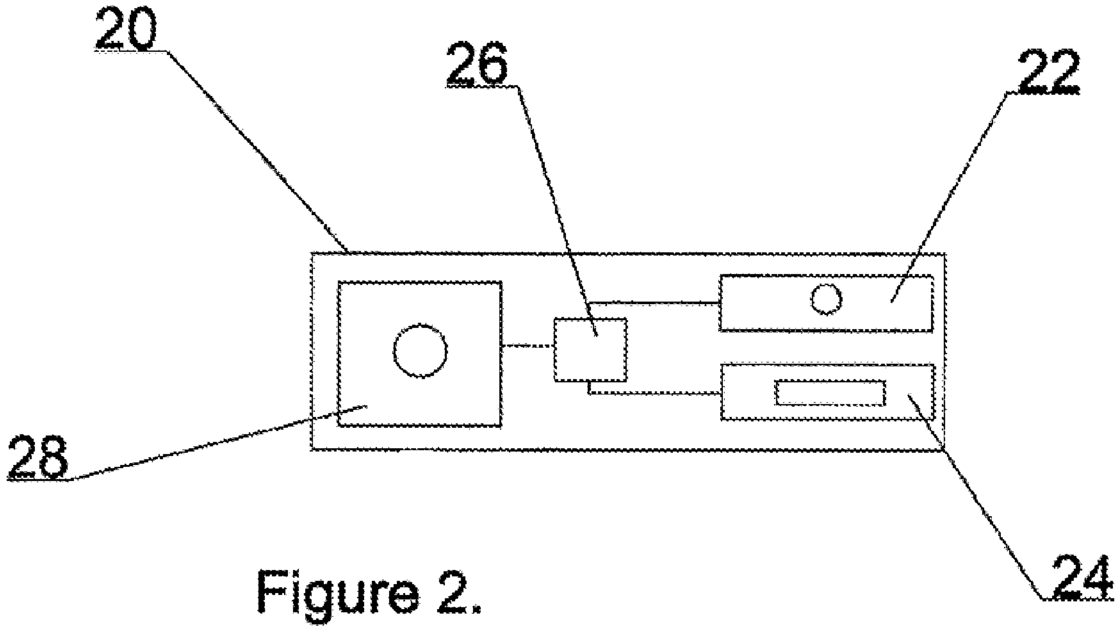
FIG. 2 shows, perspective view, a system for speed measurement verification, in accordance with the invention, which system is associated with the method shown in FIG. 2.

With reference to the accompanying drawings, a method of speed measurement verification, in accordance with the invention, is generally indicated by reference numeral 10.

In the following example, the speed of a vehicle is measured by means of a laser speed measurement system. In other examples, the speed may be measured by a pressure sensor, a radar gun, or the like. Accordingly, the system 20 includes an electromagnetic wave transmitter 22 and receiver 24 which together comprises the speed measuring means.

The method 10 includes the steps of automatically measuring 12 the speed of a vehicle 32 traveling on a road surface 36 which includes a fixed marker 34 at a predetermined distance from a point where the speed of the vehicle 32 is measured.

The method 10 also includes the step of automatically comparing 14 the measured speed of the vehicle 32 to a predetermined speed limit, and automatically calculating 16 a time delay to activate a camera 28 directed at the marker 34 if the measured speed exceeds the speed limit. It is to be appreciated that the time delay is calculated according to the measured speed of the vehicle 32 from an instance when the speed measurement was made, so that the camera 28 is activated when the vehicle 32, if traveling at the measured speed, reaches the marker 34.

The method 10 further includes the step of automatically capturing 18 an image with the camera 28 after expiration of the time delay so that, if the measured speed is accurate, the vehicle 32 will be positioned proximate the marker so that the captured image showing the vehicle 32 relative to the marker 34 is able to serve as verification of the accuracy of the measured speed.

The following example explains one embodiment of the invention where laser speed measurement equipment is used to determine the speed of the vehicle 32. It is, however, to be appreciated that the invention is not limited to this embodiment.

In one embodiment of the invention, the method 10 includes the step of automatically 12 measuring the speed of the vehicle 32 traveling on the road surface 36 by determining a change in distance of the vehicle 32 from a stationary transmitter 22. The transmitter sequentially transmits at least two electromagnetic waves having known velocities to the vehicle 32, and receives the waves reflected from the vehicle 32, wherein the known velocity of a wave together with the time taken between transmission and reception of that wave enables the calculation of the distance 40 from the transmitter 22 to the vehicle 32. This enables the speed of the vehicle 32 to be calculated by dividing the measured change in distance of the vehicle 32 by a predetermined interval between the transmission of the waves to the vehicle 32.

It is to be appreciated that, in the embodiment of the invention where a laser system is used to measure the speed of the vehicle, at least two pulsed waves are necessary so that two distance measurements may be taken at different time intervals. This enables the calculation of the speed as the change in distance divided by the known time between measurements.

In another embodiment of the invention, the method 10 includes the step of automatically measuring 12 the speed of the vehicle 32 and distance to the same vehicle 32 by using continuous pulses of electromagnetic waves having certain characteristics being transmitted to a vehicle 32 so that the reflected waves are received and analyzed for any changes in the characteristics. For example, the Doppler Effect, or the like, can be used to measure and/or calculate the speed of the vehicle. In further embodiments, the distance to the vehicle may be measured and/or calculated by measuring the time it takes an electromagnetic wave traveling at a known velocity from transmitter 22 to vehicle 32 to reflect back to receiver 24. The change in the distance traveled by the measured vehicle per predetermined time over at least two waves can also be used to calculate the speed the vehicle is traveling by dividing the predetermined time into the change of the distance to the vehicle measured.

In other embodiments of the invention, a single electromagnetic wave having known characteristics is transmitted to the vehicle 32 so that the reflected wave is received and analyzed for any changes in the characteristics. These characteristics may include the transmitter 22 changing the frequency of the electromagnetic wave at a certain rate. The receiver 24 will receive the wave reflected by a vehicle 32 at a certain frequency different to that presently used by the transmitter 22. If the rate of frequency change by the transmitter is known and/or can be measured by the receiver 24 and the velocity of the waves are known, then the distance between the transmitter 22 and the vehicle 32 can be calculated and/or measured. The speed of the vehicle can also be measured and/or calculated by using the change in distance traveled by the vehicle per predetermined unit of time, or the like.

The method 10 further includes comparing 14 the measure speed to the speed limit on that particular road surface. The method 10 then also includes the step of automatically calculating 16 the time delay to predict the arrival of the vehicle at the projected position, i.e. where the marker 34 is located, on the surface 36 according to the measured speed of the vehicle 32. This position corresponds with where the moving vehicle 32 will be located if the measured speed is accurate.

The method 10 then includes the step of capturing 18 an image of the projected position so that, if the measured speed is in fact accurate, the vehicle 32 will be positioned at the projected position relative to the fixed marker 34 located on the surface 36. The marker 34 is at a predetermined distance 40 from the transmitter 22 so, accordingly, the marker 34 provides a fixed reference point for the captured image to show the vehicle 32 relative to the marker 34. The image is then able to serve as verification of the accuracy of the measured speed.

Accordingly, the calculated time delay is typically incorporated with the captured image, e.g. digitally stored on a digital image, printed on an image, or the like. Furthermore, an actual time measurement of a period it took the vehicle 32 to reach the marker 34 from the position the speed measurement was taken may be incorporated with the captured image, e.g. a measured time delay as opposed to the calculated time delay.

It is to be appreciated that, by calculating 16 the projected position of the vehicle 32 according to the measured speed, and capturing 18 the image of the vehicle 32 after the calculated time delay on the marker, serves as proof that the measured speed is accurate.

The method 10 generally includes, prior to measuring 12 the speed of the vehicle 32, the step of placing the marker 34 on the road surface 36 at a predetermined distance 40 from the transmitter 22. The marker 34 is typically three lines painted onto the surface 36, generally perpendicular lines across the breadth of a road, or the like. The lines are also further separated a predetermined distance from each other to provide a more accurate marker to verify the measured speed of vehicle 32. For example, the middle of the three lines is located 250 meters from the transmitter 22, and a line 0.1 meter from the middle line is drawn on each side of the middle line to form the marker 34, i.e. tolerances. The tolerances are calculated according to the speed limit, expected speeds on the surface, the predetermined distance, equipment tolerances, and/or the like.

For example, if a vehicle accelerates after its speed has been measured, the vehicle may be positioned over the center line. If a vehicle decelerates after its speed has been measured, the vehicle may be positioned before the center line. It is to be appreciated that the marker is generally so located that, once the speed of a vehicle has been measured, the vehicle is not afforded an opportunity to alter its speed, e.g. the distance from the point where the speed is measured to the marker is minimized, or the like.

In a preferred embodiment of the invention, the electromagnetic wave used to measure the speed of the vehicle 32 is a laser beam. It is to be appreciated that the known velocity of an electromagnetic wave is typically the speed of light.

In a preferred embodiment of the invention, the step of measuring 12 the speed of the vehicle 32 includes sequentially transmitting and receiving a plurality of waves, e.g. laser beams, to and from the vehicle 32, and statistically analyzing the plurality of waves to generate a trend of changes in distance of the vehicle 32 to maximize the accuracy of the measured speed.

In general, the system 20 for speed measurement verification, associated with the above method 10, includes speed measuring means configured to automatically measure 12 the speed of the vehicle 32 traveling on the surface 36. The marker 34 is at a predetermined distance 40 from the speed measuring means.

The system 20 also includes a camera directed, in use, at the marker 34, and a processor 26 arranged in electronic communication with the speed measuring means and the camera 28. The processor 26 is configured to automatically compare 14 the measured speed of the vehicle 32 to a predetermined speed limit, and to automatically calculate 16 a time delay to activate the camera 28 if the measured speed exceeds the speed limit. The time delay is calculated according to the measured speed of the vehicle 32 from the instance when the speed measurement was made, so that the camera 28 is activated when the vehicle 32, if traveling at the measured speed, reaches the marker 34. The camera is then activated to capture 18 an image after expiration of the time delay so that, if the measured speed is accurate, the vehicle 32 will be positioned proximate the marker 34. This captured image then shows the vehicle 32 relative to the marker 34 which image is then able to serve as verification of the accuracy of the measured speed.

It is to be appreciated that the time delay is calculated to compensate for any other delays present in the system 20, such as camera shutter speed, calculation delays, communication delays, equipment tolerances, and/or the like.

Similar to the method 10, a more specific example is given where the system 20 includes laser speed measurement equipment comprising the speed measuring means.

Figure 3:
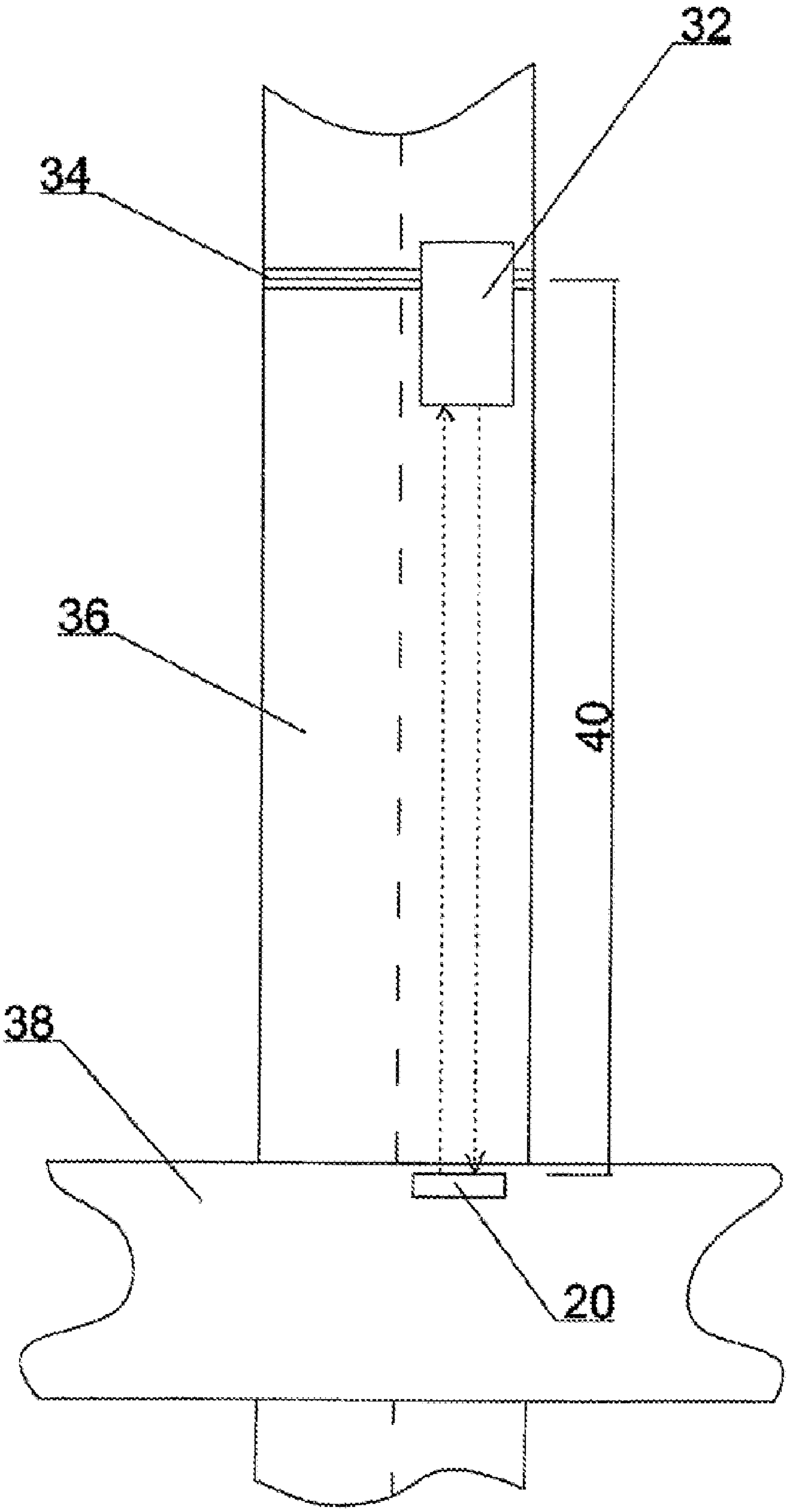
FIG. 3 shows, in perspective top view, the system shown in FIG. 2, in use.

In one embodiment, the system 20 associated with the method 10 accordingly includes an electromagnetic wave transmitter 22 configured to automatically and sequentially transmit at least two pulsed electromagnetic waves having known velocities to the vehicle 32 traveling on the surface 36, which is generally a road, as shown in FIG. 3.

The system 20 also includes a receiver 24 configured for automatically receiving the transmitted electromagnetic waves reflected from the vehicle 32. The processor 26 arranged in electronic communication with the transmitter 22 and receiver 24 which processor 26 is configured to automatically measure the speed of the vehicle 32. The speed is measured, in this particular example, by determining a change in distance of the vehicle 32 from the transmitter 22 by considering the known velocity of a transmitted wave (generally the speed of light) together with the time taken between transmission and reception of that wave. This enables the processor 26 to calculate the distance from the transmitter 22 to the vehicle 32. In this manner the speed of the vehicle 32 can be measured by dividing the measured change in distance of the vehicle 32 by a predetermined interval between the transmission of the waves to the vehicle 32.

The processor 26 calculates the time delay according to the measured speed of the vehicle 32 so that the projected position corresponds with where the vehicle 32 will be located on the surface 36 if the measured speed is, in fact, accurate.

The system also includes a camera 28 arranged in electronic communication with the processor 26 which camera 28 is configured to capture an image of the projected position after expiration of the time delay so that, if the calculated speed is accurate, the vehicle 32 will be positioned at the projected position relative to the fixed marker 34. The marker 34 provides a fixed reference point, so that the captured image showing the vehicle 32 relative to the marker 34 is able to serve as verification of the accuracy of the measured speed of the vehicle 32.

It is to be appreciated that the captured image itself serves as verification of the measurement of the vehicle's speed. The image shows the vehicle 32 relative to the fixed marker 34. In use, the system 20 will commence the speed measurement of the vehicle 32 before the vehicle reaches the marker 34. If the measured speed of the vehicle 32 is in excess of the speed limit for that particular road 36, the processor 26 will calculate the time delay according to the measured speed of the vehicle 32. It is to be appreciated that the projected position is so calculated that the projected position includes the marker 34.

The system 20 will then capture the image after the time delay which shows the vehicle 32 relative to the marker 34 if the measured speed is accurate, e.g. front wheels of the vehicle 32 on the marker, or the like. This serves as verification that the vehicle 32 traveled a certain distance over a certain period of time, which enables the speed to be calculated to verify that the measured speed is correct.

The calculated time delay is generally incorporated in the image, e.g. digitally stored on the image, printed on the image, or the like. In addition, an actual time measurement of a period it took the vehicle to reach the marker may be incorporated with the captured image, e.g. a measured time delay as opposed to the calculated time delay.

Such independent verification of speed measurement finds particular application where a speeding motorist is prosecuted.

The electromagnetic wave transmitted by the transmitter 22 is typically a laser beam. Otherwise, the wave may include radar, or the like.

In the embodiment shown, the transmitter 22 and receiver 24 is included in a single unit so that the distance 40 from the transmitter 22 to the vehicle 32 and the distance 40 from the vehicle 32 to the receiver 24 are the same when transmitting the wave. It is to be appreciated that, even when the vehicle 32 is moving, the velocity of the wave is of such a magnitude (typically the speed of light) when compared to that of the vehicle 32, that the distance 40 from the vehicle 32 to the transmitter 22 and the vehicle 32 to the receiver 24 do not get influenced by the comparatively slow linear movement of the vehicle 32.

It is to be appreciated that, in the embodiment shown, the camera 28 is also incorporated into the single unit but, in other embodiments, the camera 28 may be remote from where the speed measuring means is located, e.g. the camera 28 may be located at the marker 34, or the like.

In a preferred embodiment of the invention, the transmitter 22 and receiver 24 are configured to sequentially transmit and receive, respectively, a plurality of waves to and from the vehicle 32 so that the processor 26 is able to statistically analyze a trend of changes in distance of the vehicle 32 to maximize the accuracy of the measured speed.

It is to be appreciated that the transmitter 22 and receiver 24 are generally positioned so that the distance 40 from the transmitter 22 and receiver 24 to the vehicle 32 changes in a substantially linear fashion when the vehicle moves, e.g. along the road 36.

It is to be appreciated that the point where the speed of the vehicle 32 is measured may vary depending on the type of speed measuring means used. For example, where a piezo sensor is placed across the road surface 36, the predetermined distance is fixed. However, where the speed measuring means is a radar or laser gun, for instance, the exact point where the speed of the vehicle 32 is measured, can vary. This point will lie somewhere between the position of the speed measuring means and the marker 34.

Accordingly, in such an instance, the speed measuring means is typically configured to range the vehicle or measure the distance of the vehicle to the speed measuring means. This distance is required to establish the position of the vehicle or point when the speed measurement is taken. This distance measurement allows the processor 26 to calculate the time delay, as the distance from the speed measuring means to the marker 34 is known, and the distance so measured establishes the point where the vehicle's speed is measured.

The processor 26 is generally configured to perform the necessary calculations and/or measurements by executing a specific set of instructions, i.e. a software application.

In a preferred embodiment of the invention, the camera 28 is a digital camera. Accordingly, the system 20 may further be configured to transmit the captured digital image to a remote location.

It is to be appreciated that the speed measuring means may include any type of speed measuring equipment, e.g. a pressure sensor, a radar gun, or the like. The laser equipment, used in the embodiment described above, is able to determine the distance from the laser equipment to the vehicle 32. Where a pressure sensor is used, for example, the distance from where the measurement of the vehicle's speed is made to the marker 34 must be considered when calculating the time delay necessary before activating the camera 28.

It is also to be appreciated that if the measurement angle between the speed measuring means and one vehicle on the road 36 compared to a second or more vehicles on the same road but at a different position or in different traffic lanes to one another at the moment of speed and/or distance measurement is known and/or can be measured, and that this information can also be used to implement the speed verification system described above in multiple traffic lanes at the same time.

It shall be understood that the examples are provided for illustrating the invention further and to assist a person skilled in the art with understanding the invention and is not meant to be construed as unduly limiting the reasonable scope of the invention.

The Inventor regards it as an advantage that the invention provides a means whereby independent speed measurement verification of a vehicle is achievable without additional hardware than required by conventional speed measurement and capturing hardware. The Inventor regards it as a further advantage that the invention enables independent speed verification which only requires one image to be captured, and that the vehicle is identified from the same image.

The invention claimed is:

1. A system for speed measurement verification, which system includes speed measuring means configured to automatically measure the speed of a vehicle traveling on a surface which includes a fixed marker at a predetermined distance from a point where the speed of the vehicle is measured;

a camera for directing at said marker, in use; and a processor arranged in electronic communication with the speed measuring means and camera, which processor is configured to automatically compare the measured speed of the vehicle to a predetermined speed limit and, if the measured speed exceeds such a speed limit, to automatically calculate a time delay according to the measured speed and the predetermined distance to predict when the vehicle, if traveling at the measured speed, will reach the marker, the processor being further configured to activate the camera after expiration of said time delay so that, if the measured speed is accurate, the vehicle will be proximate the marker so that an image captured when the camera is activated by the processor will show the vehicle relative to the marker in order to verify the accuracy of the measured speed; wherein the speed measuring means includes an electromagnetic wave transmitter configured to automatically and sequentially transmit at least two pulsed electromagnetic waves having known velocities to the vehicle, and a receiver configured for automatically receiving the transmitted electromagnetic waves reflected from the vehicle, so that the processor is able to calculate the speed according to the flight time of the waves which have known velocities; and wherein the speed measuring means is configured to measure the distance of the vehicle to the speed measuring means to determine the distance of the point where the speed of the vehicle is measured to the marker.

2. A system as claimed in claim 1, wherein the speed measuring means is configured to measure the speed and distance of the vehicle by including a transmitter configured to transmit at least one continuous electromagnetic wave having known characteristics to the vehicle, the speed measuring means also including a receiver configured to receive the reflected wave from the vehicle, so that the processor is able to calculate the speed and distance to the speed measuring means by analyzing any changes in the characteristics of the reflected wave.

3. A system as claimed in claim 1, wherein the electromagnetic wave includes a laser beam.

4. A system as claimed in claim 1, wherein the electromagnetic wave includes a radar beam.

5. A system as claimed in claim 1, wherein the camera is directed at the marker so that, when the image is captured, the vehicle is identifiable from said image for prosecution purposes.

6. A system as claimed in claim 1, wherein the camera is directed at the marker so that, when the image is captured, a driver of the vehicle is identifiable from said image for prosecution purposes.

7. A system as claimed in claim 1, wherein the time delay is incorporated into the captured image.

8. A system as claimed in claim 7, wherein an actual time measurement of a period it took the vehicle to reach the marker is incorporated with the captured image.

9. A system as claimed in claim 1, which includes a suitable transmitter configured to transmit the captured image to a remote location.

10. A system as claimed in claim 1, wherein the marker includes at least one line painted onto the surface.

11. A system as claimed in claim 10, wherein the marker includes indications of tolerances calculated according to suitable speed measurement characteristics.

12. A system as claimed in claim 1, wherein the processor calculates the time delay to compensate for any delays inherent in the system.

13. A method for speed measurement verification, which method includes the following steps automatically measuring the speed and distance of a vehicle traveling on a surface which includes a fixed marker at a predetermined distance from a point where the speed of the vehicle is measured;

automatically comparing the measured speed of the vehicle to a predetermined speed limit;

automatically calculating a time delay if the measured speed exceeds the speed limit, which time delay is calculated according to the measured speed and the predetermined distance to predict when the vehicle, if traveling at the measured speed, will reach the marker; and automatically capturing an image with a camera directed at the marker after expiration of the time delay so that, if the measured speed is accurate, the vehicle will be positioned proximate the marker so that the captured image showing the vehicle relative to the marker is able to serve as verification of the accuracy of the measured speed;

wherein the step of automatically measuring the speed of the vehicle traveling on the surface includes determining a change in distance of the vehicle from a stationary transmitter which sequentially transmits at least two pulsed electromagnetic waves having known velocities to the vehicle so that a suitable receiver is able to receive the waves reflected from the vehicle, wherein the known velocity of a wave together with the time taken between transmission and reception of that wave enables the calculation of the distance from the transmitter to the vehicle, so that the speed of the vehicle is calculated by dividing the measured change in distance of the vehicle by a predetermined interval between the transmission of the separate waves to the vehicle; and wherein the step of measuring the speed includes measuring the distance of the vehicle to suitable measuring means to determine the distance of the point where the speed of the vehicle is measured to the marker.

14. A method as claimed in claim 13, wherein the step of measuring the speed and distance includes transmitting at least one continuous electromagnetic wave having known characteristics to the vehicle and analyzing the reflected wave to determine the speed and distance of the vehicle from any changes in the characteristics of the reflected wave.

15. A method as claimed in claim 13, which includes, prior to measuring the speed of the vehicle, the step of placing the marker on the surface.

* * * * *